US012111385B2

(12) United States Patent
Flores Tapia

(10) Patent No.: US 12,111,385 B2
(45) Date of Patent: Oct. 8, 2024

(54) RADAR SENSOR PROCESSING CHAIN

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC

( * ) Notice: Subject to any disclaimer, the term of this patent is extended or adjusted under 35 U.S.C. 154(b) by 342 days.

(21) Appl. No.: 17/560,440

(22) Filed: Dec. 23, 2021

(65) Prior Publication Data

US 2023/0204749 A1 Jun. 29, 2023

(51) Int. Cl.
G01S 13/44 (2006.01)
G01S 7/35 (2006.01)
G01S 13/00 (2006.01)
G01S 13/931 (2020.01)

(52) U.S. Cl.
CPC .......... G01S 13/4409 (2013.01); G01S 7/352 (2013.01); G01S 13/003 (2013.01); G01S 13/931 (2013.01)

(58) Field of Classification Search
CPC .... G01S 13/4409; G01S 7/352; G01S 13/003; G01S 13/931
USPC .......................................................... 342/70
See application file for complete search history.

(56) References Cited

U.S. PATENT DOCUMENTS 9,488,725 B2 * 11/2016 Max .................. G01S 15/04
9,753,121 B1 * 9/2017 Davis ................ G01S 7/282
9,810,772 B2 * 11/2017 Storz ................ G01S 7/282
9,952,312 B2 * 4/2018 Corbett ................ G01S 7/023
10,304,335 B2 * 5/2019 Jain .................... G01S 13/91
10,386,470 B2 * 8/2019 Zivkovic ............. G01S 13/931
10,481,244 B2 * 11/2019 Malik .................. G01S 7/412
10,509,119 B2 * 12/2019 Hong .................. G01S 13/003

(Continued)

FOREIGN PATENT DOCUMENTS

CN 113256726 A * 8/2021 ............. G01C 25/00
EP 2963442 A1 * 1/2016 ............. G01S 13/34

(Continued)

OTHER PUBLICATIONS

Bilik Igal et al: "The Rise of Rada for Autonomous Vehicles: Signal processing solutions and future research directions", IEEE Signal Processing Magazine, IEEE, USA, vol. 36, No. 5, Sep. 1, 2019, pp. 20-31, XP011745492, ISSN: 1053-5888, DOI: 10.1109/MSP.2019. 2926573. (Year: 2019).*

(Continued)

Primary Examiner — Nuzhat Pervin

(57) ABSTRACT

Techniques and architectures for managing radar sensor processing chains. A first high-frequency radio signal is received with a first RF receiver in the plurality of RF sensor suites on a host platform. The received high-frequency radio signal is converted to a lower second frequency range. A chirplet transform is performed on the signal in the second frequency range. Stored relative location information for a second RF receiver in the plurality of RF sensor suites is retrieved. Radar waveform information corresponding to the second RF receiver in a processing stream corresponding to the first RF receiver is extracted by utilizing the retrieved information and results from the chirplet transform. A point cloud is generated based on the converted signal in the second frequency range and the extracted radar waveform information.

17 Claims, 7 Drawing Sheets

(56) References Cited

U.S. PATENT DOCUMENTS

| | | | | |
|---|---|---|---|---|
| 10,775,481 | B1* | 9/2020 | Puglielli | G01S 7/4091 |
| 10,914,836 | B2* | 2/2021 | Lee | G01S 13/931 |
| 11,143,745 | B2* | 10/2021 | Ahmed | G01S 7/4052 |
| 11,255,958 | B2* | 2/2022 | Wang | G01S 13/42 |
| 11,340,342 | B2* | 5/2022 | Xin | H01Q 15/08 |
| 11,513,187 | B2* | 11/2022 | Stettiner | G01S 7/2883 |
| 11,639,983 | B2* | 5/2023 | Roger | G01S 13/584 |
| | | | | 342/112 |
| 11,790,413 | B2* | 10/2023 | Hoffberg | G07F 17/323 |
| | | | | 705/14.1 |
| 11,852,747 | B2* | 12/2023 | Stettiner | G01S 7/40 |
| 11,921,195 | B2* | 3/2024 | Bauer | G01S 13/584 |
| 2005/0031051 | A1* | 2/2005 | Rosen | H04B 1/713 |
| | | | | 375/147 |
| 2005/0041752 | A1* | 2/2005 | Rosen | H04L 27/001 |
| | | | | 375/259 |
| 2005/0041757 | A1* | 2/2005 | Rosen | H04L 27/001 |
| | | | | 375/295 |
| 2005/0041758 | A1* | 2/2005 | Rosen | H04L 27/001 |
| | | | | 375/316 |
| 2005/0100077 | A1* | 5/2005 | Rosen | H04L 27/001 |
| | | | | 375/130 |
| 2010/0163731 | A1* | 7/2010 | Haran | G08B 21/22 |
| | | | | 250/552 |
| 2010/0265069 | A1* | 10/2010 | Michaels | G08B 13/1654 |
| | | | | 340/572.3 |
| 2016/0223663 | A1* | 8/2016 | Schmalenberg | G01S 17/931 |
| 2016/0252606 | A1* | 9/2016 | Storz | G01S 7/282 |
| | | | | 342/201 |
| 2017/0010344 | A1* | 1/2017 | Corbett | G01S 7/023 |
| 2019/0033453 | A1* | 1/2019 | Crouch | H04B 10/40 |
| 2019/0120932 | A1* | 4/2019 | Smith | G01S 7/354 |
| 2019/0196481 | A1* | 6/2019 | Tay | G01S 17/86 |
| 2019/0196491 | A1* | 6/2019 | Balogh | G05D 1/0214 |
| 2020/0042001 | A1* | 2/2020 | Chu | G01S 13/931 |
| 2020/0103523 | A1* | 4/2020 | Liu | G01S 13/87 |
| 2020/0278435 | A1* | 9/2020 | Wang | G01S 13/931 |
| 2020/0278440 | A1* | 9/2020 | Wang | G01S 13/584 |
| 2020/0287587 | A1* | 9/2020 | Cheung | G01S 7/52 |
| 2020/0300965 | A1* | 9/2020 | Wu | G01S 13/505 |
| 2020/0371228 | A1* | 11/2020 | Wang | G06V 20/56 |
| 2021/0072349 | A1* | 3/2021 | Mayer | G01S 7/4017 |
| 2021/0124013 | A1* | 4/2021 | Motoyama | G06V 20/58 |
| 2021/0156981 | A1* | 5/2021 | Stettiner | G01S 13/931 |
| 2021/0192582 | A1* | 6/2021 | Hoffberg | G07F 17/3237 |
| 2021/0239797 | A1* | 8/2021 | Cattle | G01S 13/931 |
| 2021/0255278 | A1* | 8/2021 | Roger | G01S 13/343 |
| 2021/0263147 | A1* | 8/2021 | Bauer | G01S 13/584 |
| 2021/0293923 | A1* | 9/2021 | Arkind | G01S 7/4017 |
| 2022/0046388 | A1* | 2/2022 | Rigazio | H04W 4/80 |
| 2022/0091289 | A1* | 3/2022 | Tinker | G01V 1/18 |
| 2022/0214423 | A1* | 7/2022 | Markish | G01S 13/42 |
| 2022/0350018 | A1* | 11/2022 | Alferdaous Alazem | |
| | | | | G01S 17/95 |
| 2023/0168359 | A1* | 6/2023 | Rezvani | G01S 13/003 |
| | | | | 342/54 |

FOREIGN PATENT DOCUMENTS

| | | | | |
|---|---|---|---|---|
| EP | 3015880 | A1* | 5/2016 | G01S 13/227 |
| EP | 3559693 | B1* | 12/2020 | G01S 13/003 |
| EP | 4202473 | | 6/2023 | |
| WO | WO-2020106849 | A3* | 8/2020 | G01S 13/343 |
| WO | WO-2021146755 | A1* | 7/2021 | G01S 13/347 |
| WO | WO-2022026576 | A2* | 2/2022 | G01S 13/003 |
| WO | WO-2022139844 | A1* | 6/2022 | G01S 7/352 |

OTHER PUBLICATIONS

Gottinger Michael et al ""Coherent Automotive Radar Networks" The Next Generation of Radar-Based Imaging and Mapping", IEEE Journal of Microwaves, IEEE, vol. 1, No. 1, Jan. 11, 2021, pp. 149-163, XP011831395, DOI: 10.1109/JMW.2020.3034475. (Year: 2021).*

European Search Report and Written Opinion for EP Application No. 22207823.0-1206, mailed Mar. 30, 2023, 8 pages.

Bilik Igal et al: "The Rise of Radar for Autonomous Vehicles: Signal processing solutions and future research directions", IEEE Signal Processing Magazine, IEEE, USA, vol. 36, No. 5, Sep. 1, 2019 (Sep. 1, 2019), pp. 20-31.

* cited by examiner

RADAR SENSOR PROCESSING CHAIN

BACKGROUND

Current standalone radar sensor spatial resolution and range performance is limited to the specific antenna aperture size and waveform power for the specific standalone sensor. Information is shared between sensor systems at the point cloud level.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As mentioned above, information between different radar sensors is not shared in a way that can maximize the potential of the radar sensor suite as the use of mutual information between the sensors is typically shared only at the point cloud level. Sharing information only at the point cloud level does not support an improvement in range, velocity or spatial resolution of the resulting point clouds. Thus, these previous approaches do not take advantage of the full capabilities of radar sensor hardware systems. In the examples below, the radar sensor hardware systems are part of an autonomous vehicle (AV); however, the radar sensor hardware systems can also be part of a human-controlled vehicle having an automated driving system, or an advanced driver assistance system (ADAS).

In the examples that follow, a radar signal processing chain can utilize a heterodyne receiver to downconvert responses within the radar sensor network within a lower frequency band. A chirplet transform engine can be utilized to feed a distributed area beamformer to determine responses corresponding to multiple radar sensor suites that can be utilized to create a final point cloud having improved spatial resolution.

Figure 1:
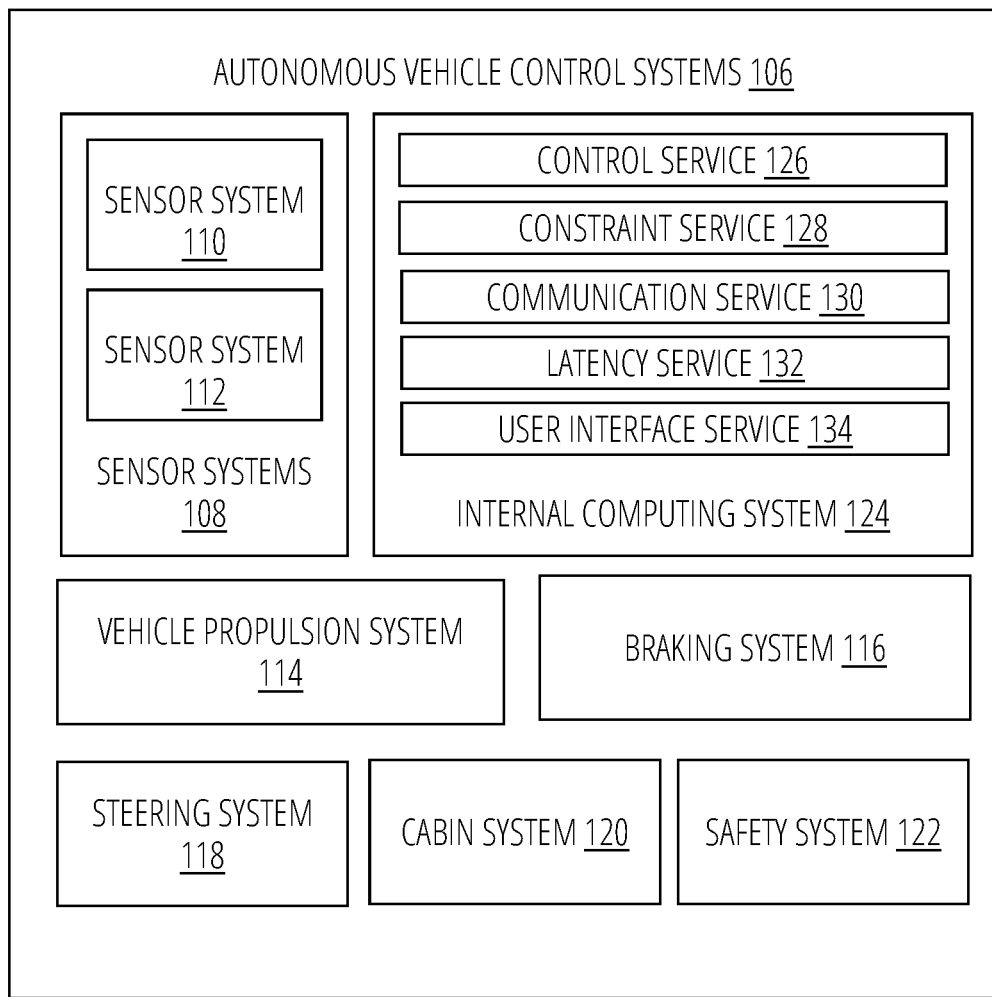
FIG. 1 is a block diagram of an example autonomous vehicle.
Figure 1:
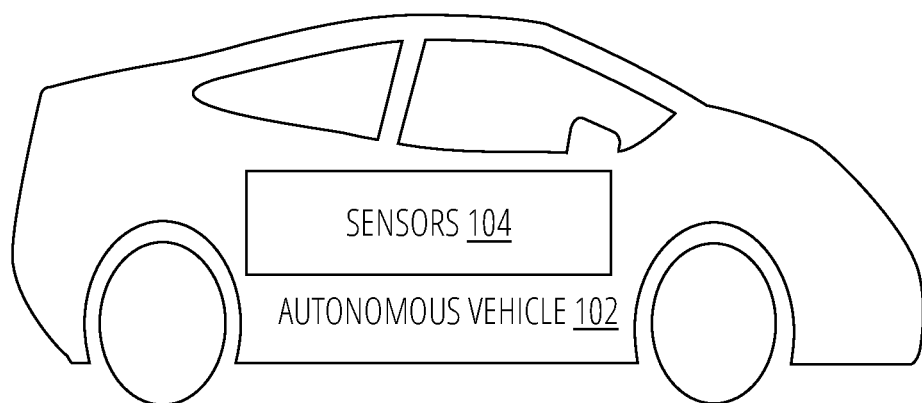

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. In the examples that follow, safety system 122 can include one or more radar systems that can interoperate to provide a radar processing chain. Specific details of example radar processing chains are described in greater detail below.

Automobiles can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems typically operate in the 77 GHz band (e.g., 76-81 GHz). SRR systems can be used, for example, for blind spot detection or collision avoidance. SRR systems typically operate in the 24 GHz band. MRR systems can operate in either the 24 GHz band or the 77 GHz band. Other frequency bands can also be supported.

Autonomous vehicle 102 can include multiple radar sensors as part of sensor systems 108. As described in greater detail below, sensor systems 108 and/or internal computing system 124 can function to allow each individual sensor (or a selected subset of multiple individual sensors) within sensor systems 108 to decode and process responses resulting from waveforms from other sensors within sensor systems 108 to generate additional information that can be used to create point clouds with higher spatial resolution and/or detect targets farther away than would otherwise be possible. As illustrated in the examples below, sensor systems 108 can include Autonomous vehicle 102 can further include internal computing system 124 that can interact with sensor systems 108 as well as the mechanical systems (e.g., vehicle propulsion system 114, braking system 116, steering system 118, cabin system 120, safety system 122). Internal computing system 124 includes at least one processor and at least one memory system that can store executable instructions to be executed by the processor. Internal computing system 124 can include any number of computing sub-systems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132, internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132, user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup, dropoff), etc.

Figure 2:
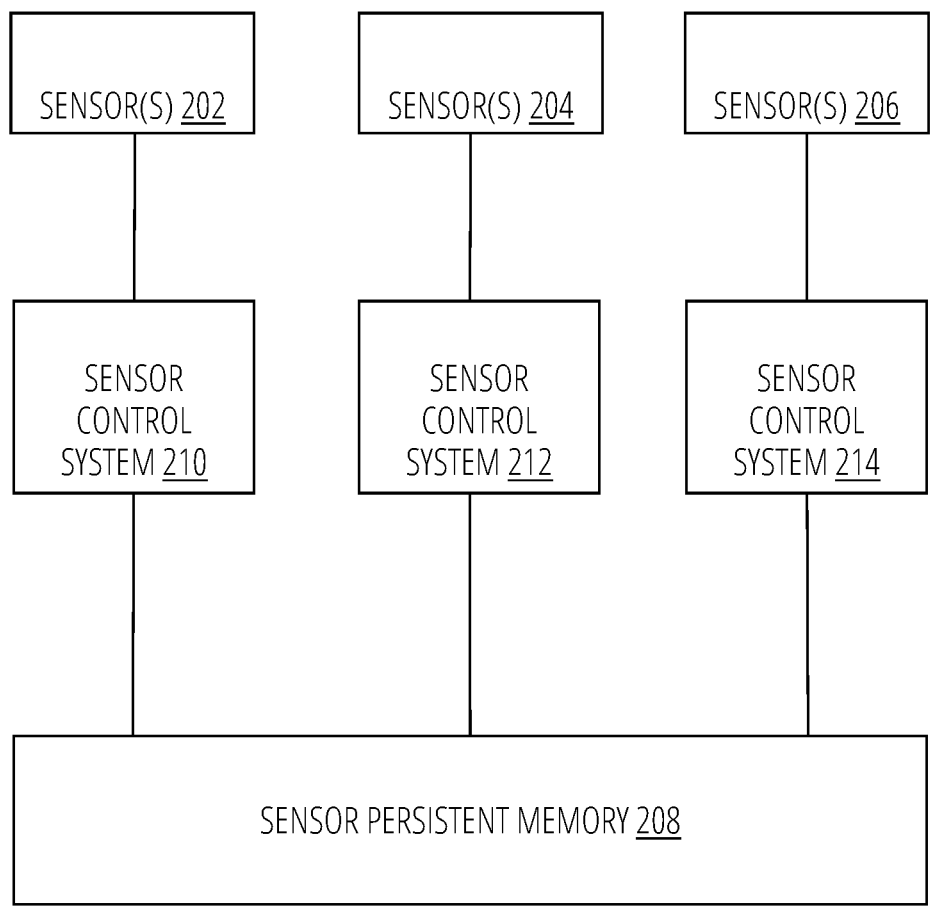
FIG. 2 is a block diagram of an example radar sensor system.

FIG. 2 is a block diagram of an example radar sensor system. The sensor system of FIG. 2 can be within, for example, an autonomous vehicle (e.g., autonomous vehicle 102). In other configurations, the sensor system can be part of a different environment.

In response to initiation of sensor calibration, the relative positions of the various radar sensors within the system (e.g., sensor(s) 202, sensor(s) 204, sensor(s) 206) are recorded in sensor persistent memory 208. In one example, this information can be provided by various sensor control systems (e.g., sensor control system 210, sensor control system 212, sensor control system 214).

Each sensor in the radar sensor system can request information from other sensors in the system and/or read relative location or other information from, for example, sensor persistent memory 208. Information that each radar sensor (or corresponding sensor control system) can request from other sensors in the system can include, for example, start frequency, phase offset, chirp rate, pulse repetition frequency. Additional and/or different information can also be requested.

Received radar echoes from each sensor (sensor(s) 202, sensor(s) 204, sensor(s) 206) can be analyzed using the acquired information about other radar units to result in an improved point cloud. Various example techniques and architectures are described in greater detail below. Utilization of the techniques and architectures described can result in a frame rate improvement of $(N-1)^2$ where N is the number of sensors in the system (e.g., in autonomous vehicle 102).

This results in improved utilization of radar sensor information because each individual sensor can decode and process responses resulting from the waveforms from other sensors in the vehicle platform. The additional information can be used, for example, to generate point clouds with higher spatial resolution and detect objects farther away than would otherwise be possible.

Current distributed aperture radar platforms dedicate an antenna element per sensor to perform sensor synchronization. This approach can result in a system performance degradation that scales linearly with the number of sensors. The approach described herein is different as the source of each of the detections is determined at the chirplet transform stage (described in greater detail below).

Figure 3:
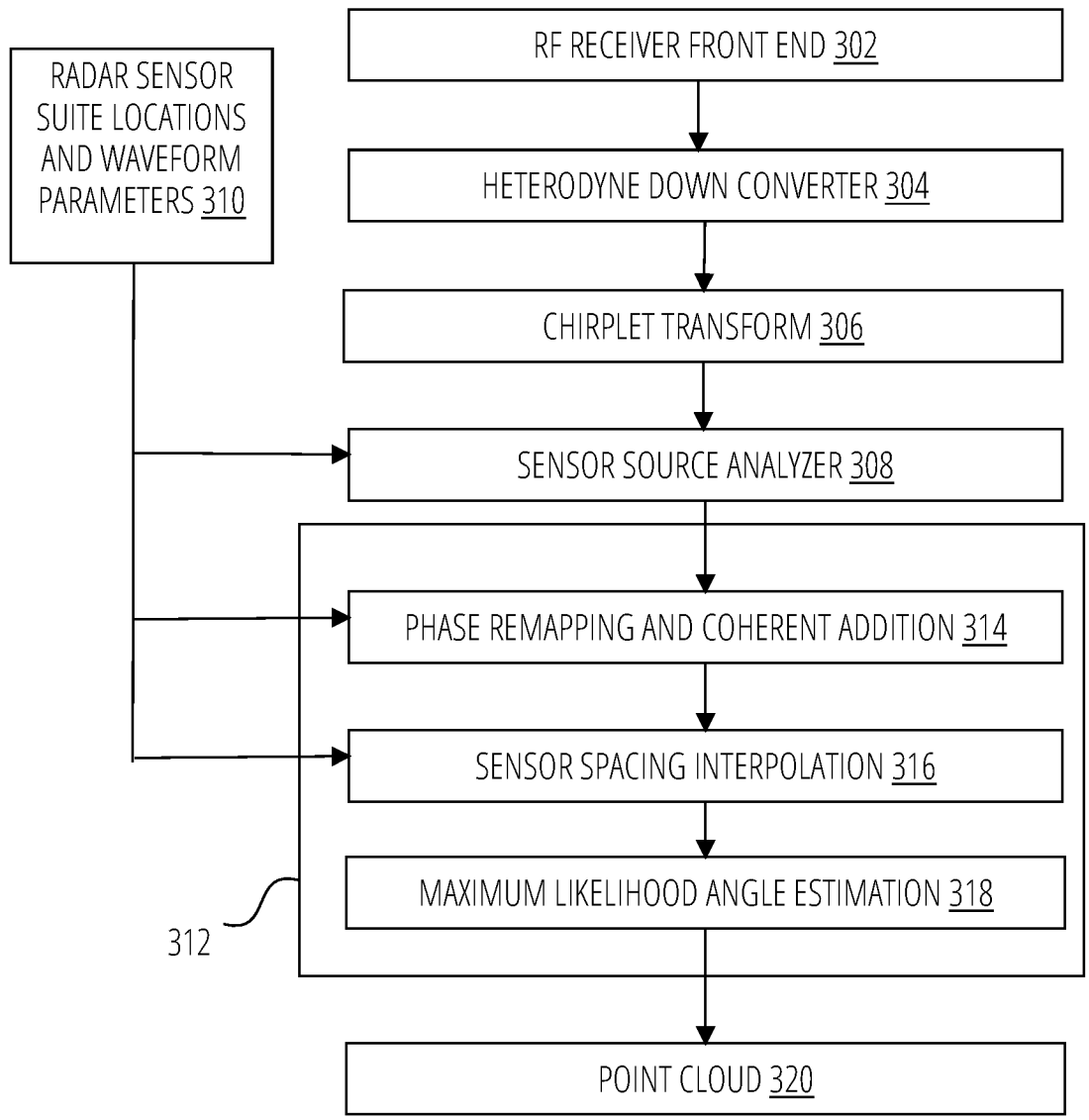
FIG. 3 is a conceptual diagram of an example radar sensor processing chain.

FIG. 3 is a conceptual diagram of an example radar sensor processing chain. In one example, components that provide the functionality described with respect to FIG. 3 can be part of an autonomous vehicle (e.g., autonomous vehicle 102), or can be part of a vehicle having ADAS functionality. The processing chain of FIG. 3 can function within, for example, the sensor system of FIG. 2 and/or within autonomous vehicle 102.

When in an operational state, RF receiver front end 302 can receive a radar signal. The received radar echoes from the scan area and can be processed by each of the sensor system (e.g., as illustrated in FIG. 2). RF receiver front end 302 can perform any signal conditioning operations for the processing operations that follow.

In one example, heterodyne down converter 304 can function to downconvert the received high-frequency radar signal to a lower frequency range for further processing. In one example, lower-frequency signal can be between 20 MHz and 100 MHz. As another example, lower-frequency signal can be between 20 MHz to 4 GHz. The choice of frequencies for lower-frequency signal can depend on, for example, a radar waveform being used and/or other factors.

Chirplet transform 306 can then be applied to the down-converted signal to calculate various waveform parameters. In one example, the waveform parameters can include chirp rate, start frequency, end frequency and time delay for each received response. In alternate examples, additional and/or different waveform parameters can be determined.

The results from chirplet transform 306 for each waveform are compared with waveform parameters of all other sensors and are labeled by sensor source analyzer 308 by utilizing radar sensor suite locations and waveform parameters 310. In one example, responses from non-registered/non-recognized sensors can be discarded. Distributed beamforming 312 can be performed on the output of sensor source analyzer 308.

Co-located responses can be coherently added (phase remapping and coherent addition 314) utilizing radar sensor suite locations and waveform parameters 310, which can potentially result in a longer detection range and a larger spatial frequency span. For non-equally distributed sensor suites, an interpolation approach utilizing radar sensor suite locations and waveform parameters 310 (sensor spacing interpolation 316) can be performed to eliminate potential ringing artifacts. An inverse Fourier transform can be performed to transfer the co-located and coherently added data back to the spatial domain. At this point, maximum likelihood angle estimation 318 can be performed to determine the angular location of the received response.

Outputs from distributed beamforming 312 process can be utilized to populate point cloud 320. As discussed above, creation of point cloud 320 (in contrast to current approaches) can be performed using the chirp characteristics of the received radar echoes to determine the origin of the received responses. The techniques associated with FIG. 3 can provide significant advantages over current approaches to radar signal processing. For example, the architectures and techniques described do not require additional processing to synchronize various elements of a sensor suite, which can provide a frame rate improvement and each individual sensor can decode and process responses resulting from the waveforms of other sensors in the platform. Further, a larger spatial frequency span can be used to generate point clouds with a higher spatial resolution than would otherwise be possible and to detect objects farther away than would otherwise be possible.

The approaches described herein can also improve the utilization of radar sensor hardware in the host platform. Distributed aperture radar technologies dedicate an antenna element per sensor to perform sensor synchronization, which can result in system performance degradation that scales linearly with the number of sensors. The approaches described herein, in contrast, utilizes chirplet transform 306 as the source of detections for distributed beamforming 312.

Figure 4:
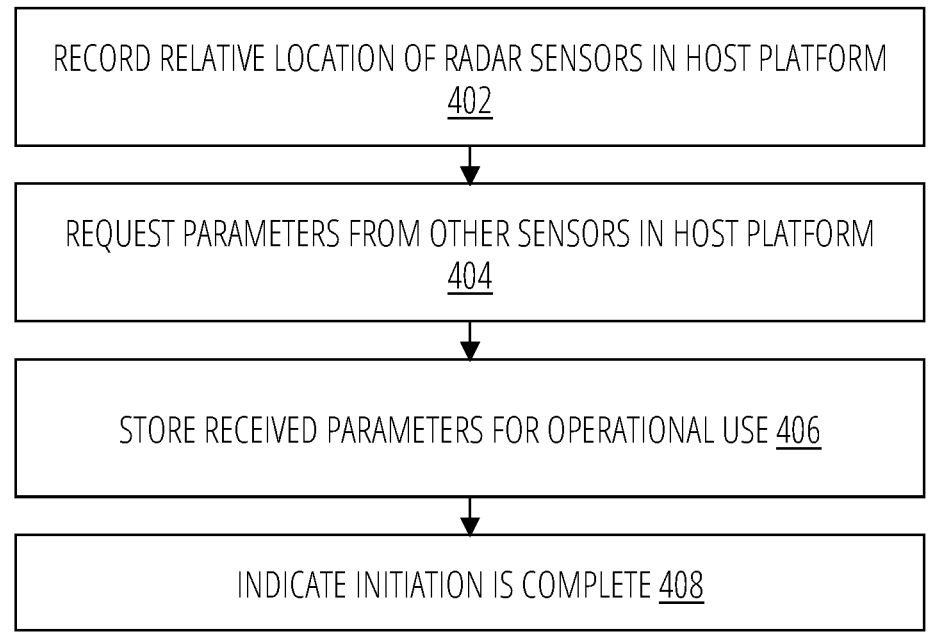
FIG. 4 is a flow diagram of one example technique for calibrating a radar sensor processing chain.

FIG. 4 is a flow diagram of one example technique for calibrating a radar sensor processing chain. The process as described with respect to FIG. 4 can be utilized, for example, when calibrating radar sensors on autonomous vehicle 102. Alternatively, the process illustrated in FIG. 4 can be utilized when calibrating radar sensors for use in a human-operated vehicle having an ADAS.

In block 402, the relative locations of radar sensors on the host platform (e.g., autonomous vehicle 102) are recorded. This can be performed for each radar sensor in a group of radar sensors. In one example, this information can be stored is persistent memory (e.g., sensor persistent memory 208) on the host platform. The storage location can be centralized or distributed.

In block 404, each radar sensor in the group of radar sensors can request various parameters from the other radar sensors in the group of radar sensors. The parameters requested can be, for example, start frequency, phase offset, chirp rate and/or pulse repetition rate. Additional and/or different parameters can also be requested.

In block 406, each of the radar sensors can save the received parameters for operational use. The received parameters can be stored in local storage utilized by, for example, the corresponding sensor control system (e.g., sensor control system 210, sensor control system 212, sensor control system 214), or the received parameters can be stored in a central storage (e.g., sensor persistent memory 208). In block 408, one or more of the sensors can indicate the initiation is complete.

Figure 5:
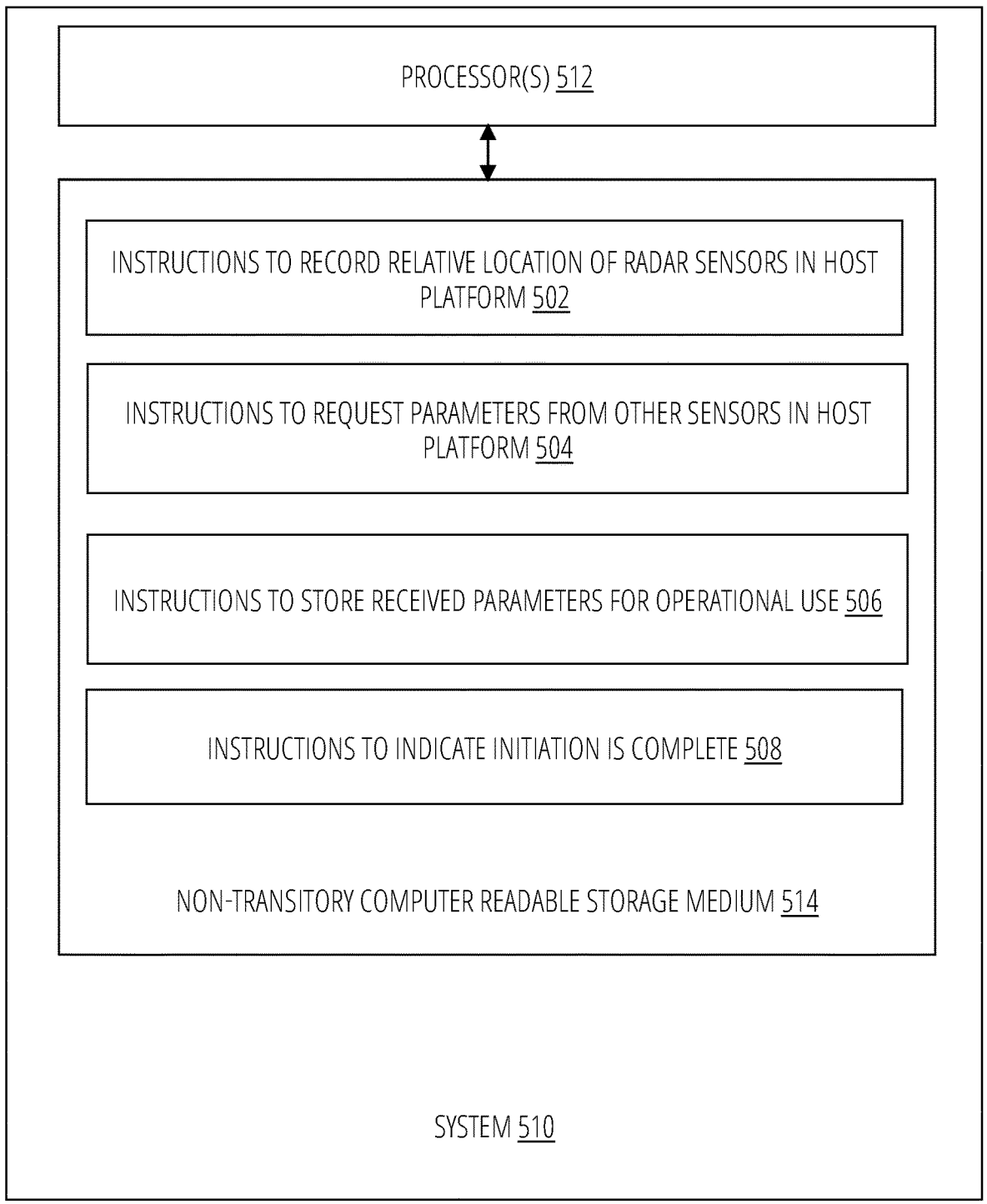
FIG. 5 is a block diagram of one example of a processing system that can provide calibration of a radar sensor processing chain.

FIG. 5 is a block diagram of one example of a processing system that can provide calibration of a radar sensor processing chain. In one example, system 510 can be part of an autonomous vehicle (e.g., autonomous vehicle 102 as part of internal computing system 124) that utilizes various sensors including radar sensors. In other examples, system 510 can be part of a human-operated vehicle having an advanced driver assistance system (ADAS) that can utilized various sensors including radar sensors.

In an example, system 510 can include processor(s) 512 and non-transitory computer readable storage medium 514. Non-transitory computer readable storage medium 514 may store instructions 502, 504, 506 and 508 that, when executed by processor(s) 512, cause processor(s) 512 to perform various functions. Examples of processor(s) 512 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 514 include tangible media such as random access memory (RAM), read-only memory (ROM), electrically erasable programmable read-only memory (EEPROM), flash memory, a hard disk drive, etc.

Instructions 502 can, when executed, cause processor(s) 512 to record the relative locations of radar sensors on the host platform (e.g., autonomous vehicle 102). This can be performed for each radar sensor in a group of radar sensors. In one example, this information can be stored is persistent memory (e.g., sensor persistent memory 208) on the host platform. The storage location can be centralized or distributed.

Instructions 504 can, when executed, cause processor(s) 512 each radar sensor in the group of radar sensors to request various parameters from the other radar sensors in the group of radar sensors. The parameters requested can be, for example, start frequency, phase offset, chirp rate and/or pulse repetition rate. Additional and/or different parameters can also be requested.

Instructions 506 can, when executed, cause processor(s) 512 each of the radar sensors in the group of radar sensors to save the received parameters for operational use. The received parameters can be stored in local storage utilized by, for example, the corresponding sensor control system (e.g., sensor control system 210, sensor control system 212, sensor control system 214), or the received parameters can be stored in a central storage (e.g., sensor persistent memory 208). Instructions 508, when executed, can cause processor(s) 512 to cause one or more of the sensors to indicate the initiation is complete.

Figure 6:
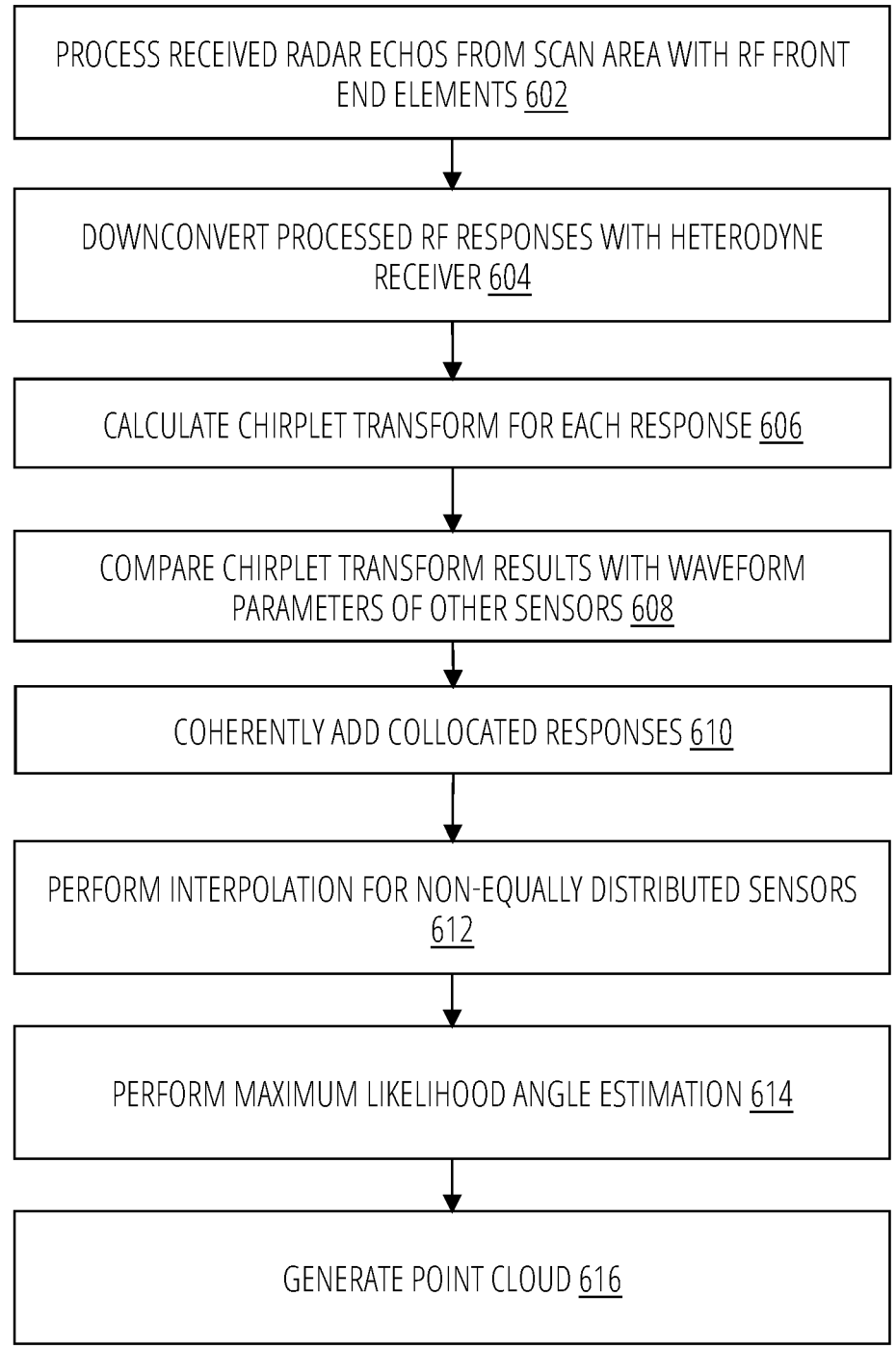
FIG. 6 is a flow diagram of one example technique for managing a radar sensor processing chain.

FIG. 6 is a flow diagram of one example technique for managing a radar sensor processing chain. The process as described with respect to FIG. 6 can be utilized, for example, when operating radar sensors on autonomous vehicle 102. Alternatively, the process illustrated in FIG. 6 can be utilized when calibrating radar sensors for use in a human-operated vehicle having an ADAS.

In block 602, received radar echoes for a scan area are processed with RF front end elements. In one example, each radar sensor of the host platform (e.g., autonomous vehicle 102, human-operated vehicle with ADAS) performs the operations described with respect to FIG. 6 for radar echoes received by the respective radar sensors.

In block 604, the processed signals are downconverted utilizing a heterodyne receiver. In one example, radar frequency signals are downconverted to the 20 MHz to 100 MHz range. In another example, radar frequency signals are downconverted to the 20 MHz to 4 GHz range. In general, the frequency range to which a radar frequency signal is down converted can be dependent upon the radar waveform being used.

In block 606, a chirplet transform is calculated for each downconverted signal. The chirplet transform calculation can provide, for example, chirp rate, start frequency, end frequency and time delay for each downconverted signal.

In block 608, the results from the chirplet transform are compared with waveform parameters corresponding to other radar sensors in the host platform. The waveform parameters (e.g., radar sensor suite locations and waveform parameters 310) can be obtained, for example, utilizing the functionality described with respect to FIG. 4 and FIG. 5.

In block 610, any collocated responses can be coherently added. This can potentially provide a longer detection range. In block 612, responses for non-equally distributed sensors can be interpolated to eliminate potential ringing artifacts. An inverse Fourier transform can be performed to transfer the co-located and coherently added data back to the spatial domain. In block 614, a maximum likelihood angle estimation is performed for all received responses to determine the angular location for each of the received responses.

In block 616, the results from block 610, block 612 and block 614 are utilized to generate a point cloud. In the example of an autonomous vehicle, the generated point cloud can be provided to control mechanisms (e.g., internal computing system 124) of the autonomous vehicle for use in controlling various systems (e.g., vehicle propulsion system 114, braking system 116, 118, cabin system 120, safety system 122) of the autonomous vehicle. Similarly, the generated point cloud can be provided to an ADAS of a human-operated vehicle to provide ADAS functionality within the human-operated vehicle platform.

Figure 7:
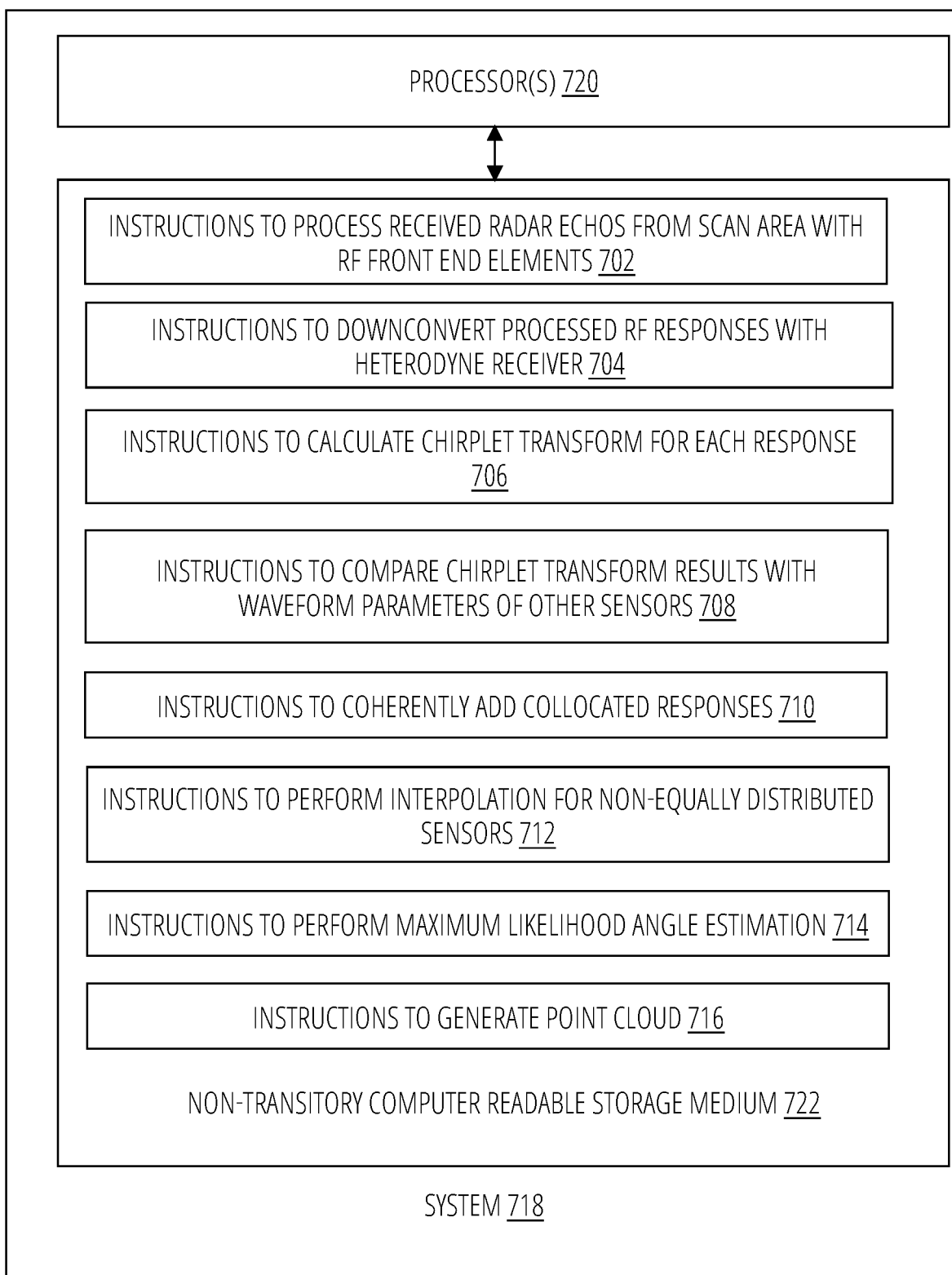
FIG. 7 is a block diagram of one example of a processing system that can provide operation of a radar sensor processing chain.

FIG. 7 is a block diagram of one example of a processing system that can provide operation of a radar sensor processing chain. In one example, system 718 can be part of an autonomous vehicle (e.g., autonomous vehicle 102 as part of internal computing system 124) that utilizes various sensors including radar sensors. In other examples, system 718 can be part of a human-operated vehicle having an advanced driver assistance system (ADAS) that can utilized various sensors including radar sensors.

In an example, system 718 can include processor(s) 720 and non-transitory computer readable storage medium 722. Non-transitory computer readable storage medium 722 may store instructions 702, 704, 706, 708, 710, 712, 714 and 716 that, when executed by processor(s) 720, cause processor(s) 720 to perform various functions. Examples of processor(s) 720 may include a microcontroller, a microprocessor, a CPU, a GPU, a DPU, an ASIC, an FPGA, a SoC, etc. Examples of a non-transitory computer readable storage medium 722 include tangible media such as RAM, ROM, EEPROM, flash memory, a hard disk drive, etc.

Instructions 702, when executed, cause processor(s) 720 to process received radar echoes for a scan area with RF front end elements. In one example, each radar sensor of the host platform (e.g., autonomous vehicle 102, human-operated vehicle with ADAS) performs the operations described with respect to FIG. 7 for radar echoes received by the respective radar sensors.

Instructions 704, when executed, cause processor(s) 720 to downconvert the received signals utilizing one or more heterodyne receiver. In one example, radar frequency signals are downconverted to the 20 MHz to 100 MHz range. In another example, radar frequency signals are downconverted to the 20 MHz to 4 GHz range.

Instructions 706, when executed, cause processor(s) 720 to calculate a chirplet transform for each downconverted signal. The chirplet transform calculation can provide, for example, chirp rate, start frequency, end frequency and time delay for each downconverted signal.

Instructions 708, when executed, cause processor(s) 720 to compare the results from the chirplet transform with waveform parameters corresponding to other radar sensors in the host platform. The waveform parameters (e.g., radar sensor suite locations and waveform parameters 310) can be obtained, for example, utilizing the functionality described with respect to FIG. 4 and FIG. 5.

Instructions 710, when executed, cause processor(s) 720 to any collocated responses to be coherently added. This can potentially provide a longer detection range. Instructions 712, when executed, cause processor(s) 720 to interpolate responses for non-equally distributed sensors to eliminate potential ringing artifacts. An inverse Fourier transform can be performed to transfer the co-located and coherently added data back to the spatial domain. Instructions 714, when executed, cause 720 to perform a maximum likelihood angle estimation for all received responses to determine the angular location for each of the received responses.

Instructions 716, when executed, cause processor(s) 720 to generate a point cloud utilizing the results from instructions 710, instructions 712 and instructions 714. In the example of an autonomous vehicle, the generated point cloud can be provided to control mechanisms (e.g., internal computing system 124) of the autonomous vehicle for use in controlling various systems (e.g., vehicle propulsion system 114, braking system 116, 118, cabin system 120, safety system 122) of the autonomous vehicle. Similarly, the generated point cloud can be provided to an ADAS of a human-operated vehicle to provide ADAS functionality within the human-operated vehicle platform.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 514 and/or non-transitory computer readable storage medium 722 has stored thereon data representing sequences of instructions that, when executed by processor(s) 512 and/or processor(s) 720, cause processor(s) 512 and/or processor(s) 720 to perform certain operations.

An example is an example or example. Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A system comprising:
    a memory system to store processor-executable instructions; a
    plurality of radio frequency (RF) sensor suites; and
    a plurality of hardware processors coupled with the memory system and with the plurality of RF sensor suites each having at least a corresponding RF receiver, the plurality of hardware processors are configured to:
        receive a first radio signal with a first RF receiver in the plurality of RF sensor suites;
        convert the received first radio signal to a second frequency range;
        perform at least a chirplet transform on the converted signal in the second frequency range;
        retrieve stored relative location information for a second RF receiver in the plurality of RF sensor suites;
        extract radar waveform information corresponding to the second RF receiver with a controller corresponding to the first RF receiver by utilizing the retrieved information and results from the chirplet transform;
        generate a point cloud based on the converted signal in the second frequency range and the extracted radar waveform information;
        store the point cloud in the memory system;
        coherently add collocated responses;
        interpolate extracted waveform information for multiple RF receivers that are non-equally distributed; and
        perform a maximum likelihood angle estimation to determine an angular location corresponding to the second RF receiver.

2. The system of claim 1 wherein the plurality of hardware processors are further configured to:
    determine a relative location of the second RF receiver; and
    store an indication of the relative location of the second RF receiver in a persistent memory accessible by the first RF receiver.

3. The system of claim 1 wherein the waveform information for the second RF receiver comprises a start frequency, a phase off set, a chirp rate and a pulse repetition frequency.

4. The system of claim 1 wherein the extracted radar waveform information comprises waveform information received by the first RF receiver corresponding to a waveform generated by an RF transmitter associated with the second RF receiver.

5. The system of claim 1 wherein the system comprises an autonomous vehicle.

6. The system of claim 5 wherein the plurality of hardware processors are further configured to utilize the point cloud as part of control operations for operating the autonomous vehicle.

7. A non-transitory computer readable medium having stored thereon instructions that, when executed by one or more processors, cause the one or more processors to:
    receive, with a first radio frequency (RF) receiver on a host platform, a radio signal in a first frequency range;
    convert the received radio signal in the first frequency range to a corresponding signal in a second frequency range;
    perform chirplet transform on the signal in the second frequency range;
    retrieve waveform parameters for at least a second RF receiver on the host platform;
    extract waveform information corresponding to at least the second RF receiver by utilizing results from the chirplet transform and the retrieved waveform parameters;
    generate a point cloud with the received radio signal and the extracted waveform information;
    store the point cloud in a memory device;
    coherently add collocated responses;
    interpolate extracted waveform information for multiple RF receivers that are non-equally distributed; and
    perform a maximum likelihood angle estimation to determine an angular location corresponding to the second RF receiver.

8. The non-transitory computer readable medium of claim 7 further comprising instructions that, when executed by the one or more processors, cause the one or more processors to:
    determine a relative location of the second RF receiver on the host platform; and
    store an indication of the relative location of the second RF receiver in a persistent memory accessible by the first RF receiver.

9. The non-transitory computer readable medium of claim 7 wherein the waveform parameters for the second RF receiver comprise a start frequency, a phase offset, a chirp rate and a pulse repetition frequency.

10. The non-transitory computer readable medium of claim 7 wherein the host platform comprises an autonomous vehicle.

11. The non-transitory computer readable medium of claim 10 further comprising instructions that, when executed by the one or more processors, cause the one or more processors to utilize the point cloud as part of control operations for operating the autonomous vehicle.

12. The non-transitory computer readable medium of claim 7 wherein the extracted waveform information comprises waveform information received by the first RF receiver corresponding to a waveform generated by an RF transmitter associated with the second RF receiver.

13. A method comprising:
    receiving a first radio signal with a first radio frequency (RF) receiver in a plurality of RF sensor suites on a host platform;
    converting the received first radio signal to a second frequency range with a heterodyne mixer;
    performing at least a chirplet transform on the converted signal in the second frequency range with at least one hardware processor;

retrieving stored relative location information for a second RF receiver in the plurality of RF sensor suites with the at least one hardware processor;
extracting radar waveform information corresponding to the second RF receiver in a processing stream corresponding to the first RF receiver by utilizing the retrieved information and results from the chirplet transform;
generating a point cloud based on the converted signal in the second frequency range and the extracted radar waveform information with the at least one hardware processor;
storing the point cloud in a memory system;
coherently add collocated responses;
interpolate extracted waveform information for multiple RF receivers that are non-equally distributed; and
perform a maximum likelihood angle estimation to determine an angular location corresponding to the second RF receiver.

14. The method of claim 13 further comprising:
determining a relative location of the second RF receiver; and
storing an indication of the relative location of the second RF receiver in a persistent memory accessible by the first RF receiver.

15. The method of claim 13 wherein the host platform comprises an autonomous vehicle.

16. The method of claim 15 further comprising utilizing the point cloud as part of control operations for operating the autonomous vehicle.

17. The method of claim 13 wherein the waveform information for the second RF receiver comprise a start frequency, a phase offset, a chirp rate and a pulse repetition frequency.

* * * * *